UNITED STATES PATENT OFFICE.

R. B. BRASHEAR, OF PATTERSONVILLE, LOUISIANA; NANCY POINDEXTER BRASHEAR, EXECUTRIX OF SAID R. B. BRASHEAR, DECEASED.

IMPROVED MODE OF APPLYING SULPHUROUS-ACID GAS IN THE DEFECATION OF CANE-JUICE.

Specification forming part of Letters Patent No. 26,401, dated December 6, 1859.

*To all whom it may concern:*

Be it known that I, ROBERT B. BRASHEAR, of the parish of St. Mary, in the State of Louisiana, have invented a new and Improved Mode of Defecating and Clarifying Cane-Juice or other Liquids Containing the Saccharine Principle; and I do hereby declare the following to be a full and exact description thereof.

The nature of my invention consists in subjecting sugar-cane juice or other saccharine liquid to the direct action of the fumes of burning sulphur, such liquid being employed in a diffused state, so that every portion of the whole body of liquid being operated upon is brought in contact with the same almost simultaneously, and thus a cheap and expeditious defecation and clarification by either precipitation, filtration, or skimming of the juices is effected.

No description of the mechanical means of applying it is deemed necessary, since it must be apparent they may be indefinitely diversified. Suffice it to say that the juice or other liquid may be impregnated to the desired extent with the fumes by being made to fall through a space filled with the fumes of a few feet in minute particles.

What I claim as my invention, and desire to secure by Letters Patent, is—

Subjecting sugar-cane juice or other saccharine liquid to the direct action of the fumes of burning sulphur, such liquid being employed in a diffused state, as set forth, so that every or nearly every portion of the whole body of liquid is brought in contact with the same almost simultaneously, substantially as and for the purposes set forth.

ROBT. B. BRASHEAR,
By N. P. BRASHEAR,
*Executrix of estate of R. B. Brashear, deceased.*

Witnesses:
THOS. J. ROYSTER,
H. O. AMES.